United States Patent [19]
Youden et al.

[11] Patent Number: 5,272,818
[45] Date of Patent: Dec. 28, 1993

[54] DEVICE FOR DETECTING THE LOCATION OF A MACHINE TOOL

[75] Inventors: David H. Youden, Nelson; Leonard E. Chaloux; Robert Blair, both of Keene, all of N.H.

[73] Assignee: Rank Taylor Hobson Inc., Keene, N.H.

[21] Appl. No.: 936,573

[22] Filed: Aug. 27, 1992

[51] Int. Cl.⁵ .................................. B23Q 17/22
[52] U.S. Cl. ........................... 33/640; 33/641; 33/642; 33/626
[58] Field of Search .......... 33/626, 632, 638, 640, 33/641, 642, 639

[56] References Cited

U.S. PATENT DOCUMENTS

| | | | |
|---|---|---|---|
| 796,903 | 8/1905 | Farrar | 33/638 |
| 1,295,103 | 2/1919 | Boisvert | 33/642 |
| 2,349,159 | 5/1944 | Freeman | 33/642 |
| 2,648,909 | 8/1953 | Zajdel | 33/642 |
| 3,271,848 | 9/1966 | Montandon . | |
| 3,789,509 | 2/1974 | Harkness | 33/641 |
| 3,826,011 | 7/1974 | D'Aniello | 33/642 |
| 4,018,113 | 4/1977 | Blazenin et al. . | |
| 4,153,998 | 5/1979 | McMurtry . | |
| 4,235,019 | 11/1980 | Cho . | |
| 4,254,554 | 3/1981 | Germano et al. | 33/626 |
| 4,360,974 | 11/1982 | de Cuissart . | |
| 4,382,215 | 5/1983 | Barlow et al. . | |
| 4,438,567 | 3/1984 | Raiha . | |
| 4,509,264 | 4/1985 | Feichtinger . | |
| 4,611,383 | 9/1986 | Sonnek . | |
| 4,750,272 | 6/1988 | Caddell | 33/639 |
| 4,862,598 | 9/1989 | Barlow et al. . | |
| 4,879,817 | 11/1989 | McMurtry . | |
| 4,882,849 | 11/1989 | Amir | 33/640 |
| 4,890,421 | 1/1990 | Moore, Jr. et al. . | |
| 4,926,337 | 5/1990 | Gile . | |
| 4,936,023 | 6/1990 | Pechak . | |
| 5,046,262 | 9/1991 | Kerbaugh . | |

FOREIGN PATENT DOCUMENTS

| | | | |
|---|---|---|---|
| 0195561 | 4/1923 | United Kingdom | 33/642 |
| 0549271 | 11/1942 | United Kingdom | 33/641 |

*Primary Examiner*—Thomas B. Will
*Attorney, Agent, or Firm*—Lerner, David, Littenberg, Krumholz & Mentlik

[57] ABSTRACT

A tool setter is used to locate the cutting edges of a cutting machine tool with respect to the rotational axis of a lathe's workpiece holder. One or more machine tool detecting probes are mounted on the tool setter having their styluses in predetermined registration with the rotational axis of the workpiece holder. The machine tool is moved into contact with the styluses so that the location of the cutting edges of the machine tool relative to the rotational axis may be calculated. Once the precise location of the machine tool is known, the path the machine tool is required to traverse may be accurately calculated for machining the workpiece. The tool setter is removed from the workpiece holder prior to securing a workpiece to prevent contamination from spewn cutting chips and cutting oil during the machining process. The tool setter is provided with an alignment assembly to repeatedly and accurately position the styluses at the same predetermined registration locations during each mounting of the tool setter to the workpiece holder.

41 Claims, 6 Drawing Sheets

DEVICE FOR DETECTING THE LOCATION OF A MACHINE TOOL

BACKGROUND OF THE INVENTION

The present invention relates in general to a device for detecting the location of a machine tool, and more particularly, to a tool setter having one or more machine tool detecting probes which is detachably mounted to a rotatable workpiece holder in precision registration therewith in order to repeatably position the machine tool detecting probes at a predetermined fixed reference location relative to the workpiece holder upon each mounting of the tool setter to the workpiece holder.

In order to precision machine a workpiece in a lathe or other such machine, the operator must know the precise location of the machine tool at initiation of the machining operation. Once the location of the machine tool is known, the path of the machine tool can be accurately controlled during the machining operation to generate the completed workpiece.

The setting of the machine tool on a lathe was traditionally a manual operation in which the position of the machine tool in a tool holder was measured and adjusted so that its cutting tip was in a defined position. In the case of the height of the tip above the lathe bed, this was achieved by packing shims between the machine tool and tool holder until the tip height coincided with the center line of the lathe (the axis of rotation of its workpiece holder). The direction of this height adjustment may be referenced to as the Y direction of the lathe, based on the convention that the axis of rotation of the workpiece holder defines the Z axis and the tool holder is mounted for sliding movement in at least the X and Z directions.

On a modern computer numerically controlled lathe, it is known to provide a tool setter having a machine tool detecting probe in a defined position relative to the lathe bed. The probe is provided with a trigger mechanism, such as described in U.S. Pat. No. 4,153,998, which provides an output signal at the instant of contact with the machine tool to cause the lathe's controlling computer to take a reading of the machine tool's position from a measurement scale of the lathe. The difference between the measurement and the known position of the datum surface is used by the computer as an offset value for the machine tool tip during subsequent machining operations. One such tool setter and method of using same is described in U.S. Pat. No. 4,382,215.

In conventional lathes, a tool setter is fixedly mounted to the lathe bed or to a pivotable arm and includes at least one machine tool detecting probe which is located at a known distance from the lathe's center line, i.e., rotational axis of the workpiece holder. One such tool setter is known from U.S. Pat. No. 4,879,817. By moving the machine tool in contact with the probe, the location of the machine tool relative to the center line of the workpiece holder will be known and the path the machine tool will have to take in order to generate the desired workpiece can be accurately calculated.

There are a number of notable disadvantages which result from the permanent mounting of a tool setter on a lathe such as known from U.S. Pat. No. 4,879,817. For example, the machine tool detecting probes on the tool setter are subject to contamination by machine chips and/or coolant which are spewn during the machine cutting operation. Further, the probes cannot be located very close to the workpiece holder center line since they will interfere with the machine cutting operation. Minimizing the distance between the probes and the workpiece holder center line is significant because changes in the temperature of the lathe, even a few degrees, will cause its thermal expansion which will effect the accuracy of the tool setter in direct proportion to the probe's distance from the workpiece holder center line. The resulting inaccuracy in locating the machine tool will adversely effect the accurate dimensioning of the workpiece during the machine cutting operation.

SUMMARY OF THE INVENTION

It is broadly one object of the present invention to eliminate the above-noted drawbacks and disadvantages by providing a tool setter which can be accurately mounted to the workpiece holder of a lathe and removed therefrom when not in use.

Another object of the present invention is to provide a tool setter which is detachably mounted to a rotatable workpiece holder in precision registration therewith in order to repeatably position the machine tool detecting probes at a predetermined fixed reference location relative to the workpiece holder upon each mounting of the tool setter to the workpiece holder.

Another object of the present invention is to provide a tool setter which can locate the probe along the workpiece holder center line to minimize the effects of thermal expansion of the lathe.

Another object of the present invention is to provide an arrangement for accurately positioning the probe of a tool setter while securing same to the workpiece holder through the use of a spherical ball/V-groove arrangement or a point-line-plane arrangement.

Another object of the present invention is to provide for the accurate positioning of the probe of a tool setter independently of securing the tool setter to the workpiece holder.

In accordance with one embodiment of the present invention, there is disclosed a device securable to a workpiece holder for detecting the location of a machine tool, the device comprising a housing, securing means for releasably securing the housing to a workpiece holder, detecting means for detecting the location of a machine tool, and alignment means for aligning the detecting means at a predetermined location upon securing the housing to the workpiece holder.

In accordance with another embodiment of the present invention, there is disclosed a device for detecting the location of a machine tool relative to a workpiece holder having a rotational axis, the device comprising a housing, securing means for releasably securing the housing to a workpiece holder, detecting means for detecting the location of a machine tool relative to the rotational axis of the workpiece holder, and aligning means for aligning the detecting means independent of the securing means at a predetermined location relative to the rotational axis of the workpiece holder upon securing the housing to the workpiece holder.

In accordance with another embodiment of the present invention, there is disclosed an assembly for detecting the location of a machine tool, the assembly comprising a workpiece holder, a tool setter releasably securable to the workpiece holder, the tool setter including detecting means for detecting the location of a machine tool, first alignment means on the tool setter and second alignment means on the workpiece holder cooperating with the first alignment means for aligning the detecting means at a predetermined location upon securing the housing to the workpiece holder.

In accordance with another embodiment of the present invention, there is disclosed a device for detecting the location of a machine tool relative to a workpiece holder having a rotational axis, the device comprising a housing; securing means for releasably securing the housing to a workpiece holder, the securing means comprising a shaft engaged by the workpiece holder received within a bore of the housing to permit movement of the shaft relative thereto, a piston secured to the shaft, a spring compressed against the piston to maintain the shaft in a position engagable by the workpiece holder while permitting restricted movement thereof inwardly of the housing away from the workpiece holder, and adjusting means within the housing for adjusting the compression of the spring against the piston; at least one detecting means for detecting the location of a machine tool relative to the rotational axis of the workpiece holder; and aligning means for aligning the detecting means independent of the securing means at a predetermined location relative to the rotational axis of the workpiece holder upon securing the housing to the workpiece holder, the alignment means comprising a plurality of balls radial spaced about the housing for engaging a portion of the workpiece holder.

BRIEF DESCRIPTION OF THE DRAWINGS

The above description, as well as further objects, features and advantages of the present invention will be more fully understood with reference to the following detailed description of a device for detecting the location of a machine tool when taken in conjunction with the accompanying drawings, wherein.

DESCRIPTION OF THE PREFERRED EMBODIMENTS

Figure 1:
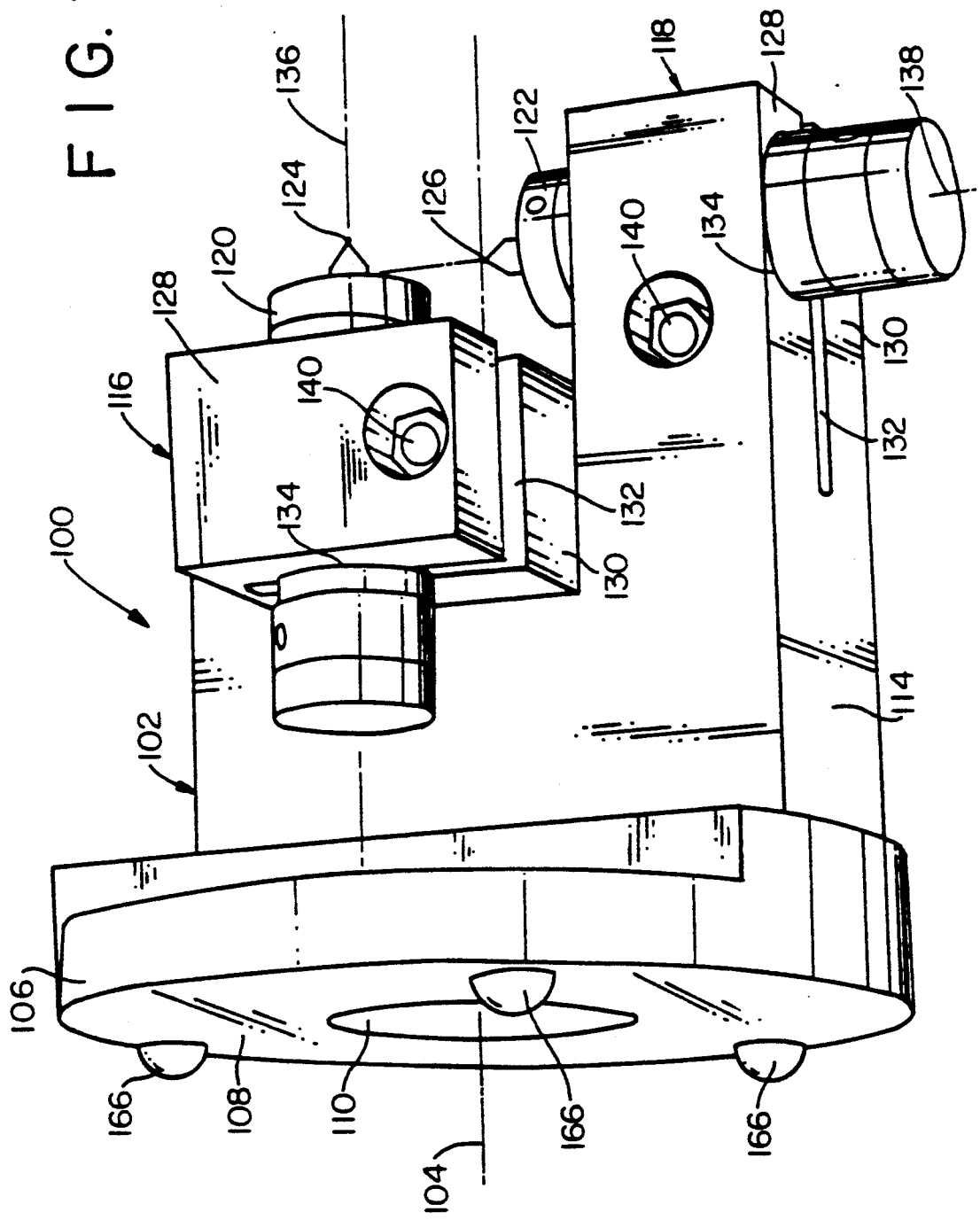
FIG. 1 is a perspective view of a tool setter for the machine tool of a lathe constructed in accordance with one embodiment of the present invention.
Figure 3:
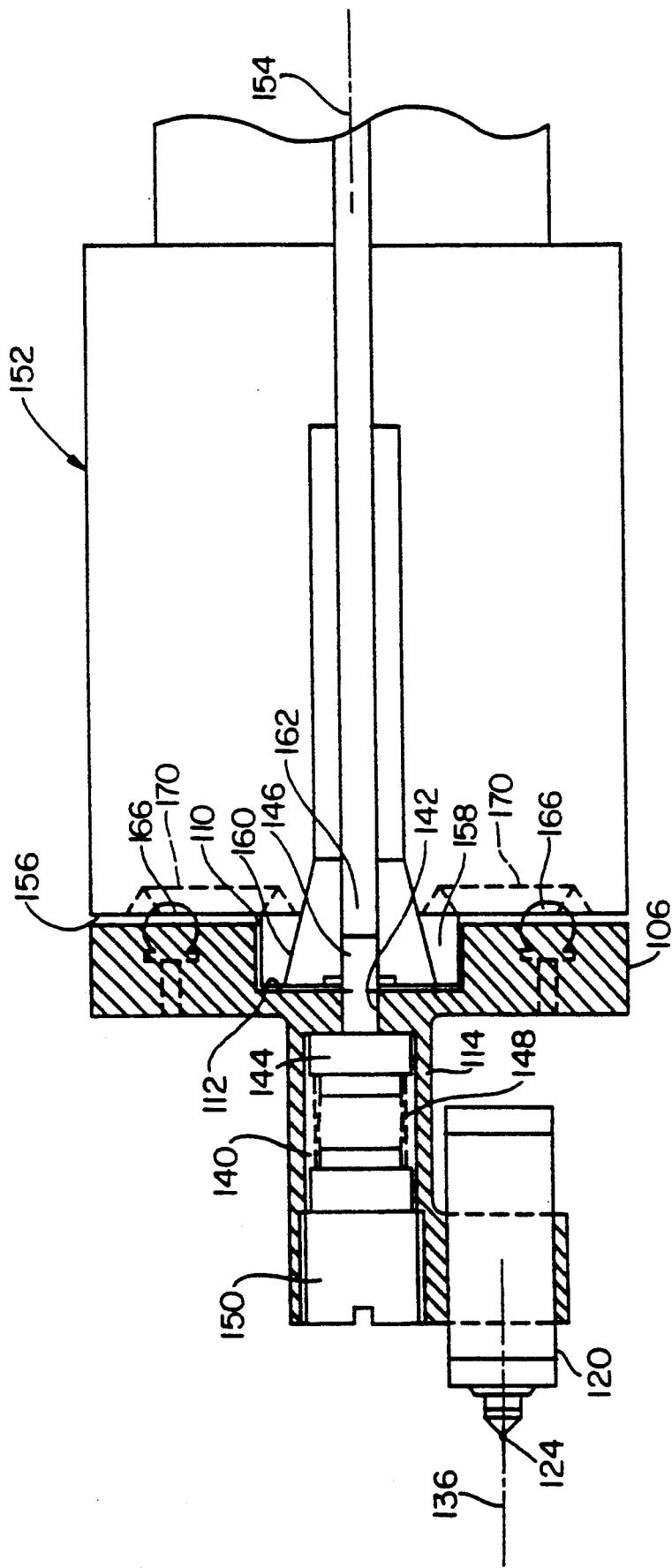
FIG. 3 is a partial cross-sectional view showing the tool setter in accordance with the present invention releasably secured to the workpiece holder of the lathe by means of a spherical ball/V-groove arrangement.

Referring now to the drawings wherein like reference numerals represent like elements, there is disclosed in FIG. 1 a tool setter designated generally by reference numeral 100. The tool setter 100 may be constructed in a variety of forms, and in accordance with one embodiment, includes a housing 102 having a longitudinal axis 104. The housing 102 is constructed to include a cylindrical flange 106 having a planar face 108 arranged transverse, i.e., perpendicular, to the housing axis 104 and a central cylindrical bore 110 terminating at an end wall 112 as shown in FIG. 3. Extending forwardly from flange 106 is a main body 114 from which there is provided first and second adjustable probe supports 116, 118 for receiving machine tool detecting probes 120, 122. The probes 120, 122 are of the linear variable differential transformer type which are available from Rank Taylor Hobson, Inc. of Keene, N.H. Each of the probes 120, 122 include a ruby ball stylus 124, 126 whose slightest displacement upon engagement with a machine tool during use of the tool setter 100 will trigger an output signal.

Figure 4:
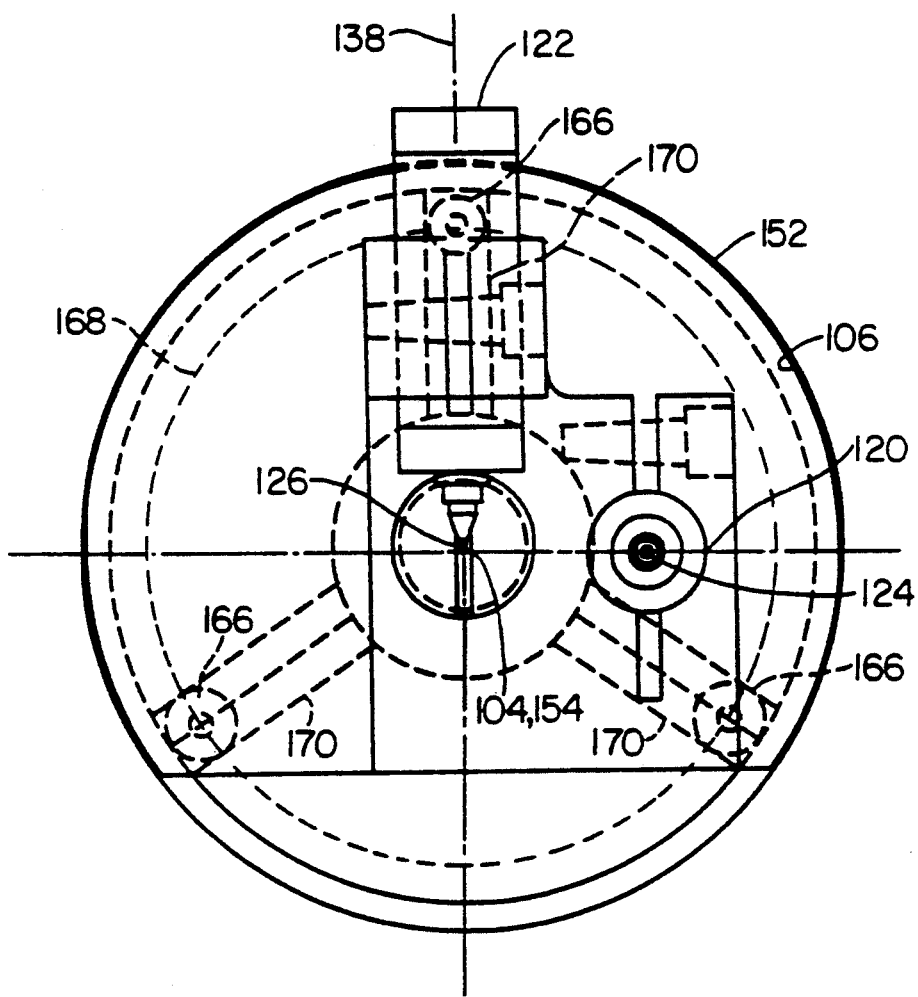
FIG. 4 is a front elevational view of the tool setter in accordance with the present invention secured to the workpiece holder of the lathe and having a pair of probes aligned in registration with the X, Y and Z axis of the workpiece holder.
Figure 5:
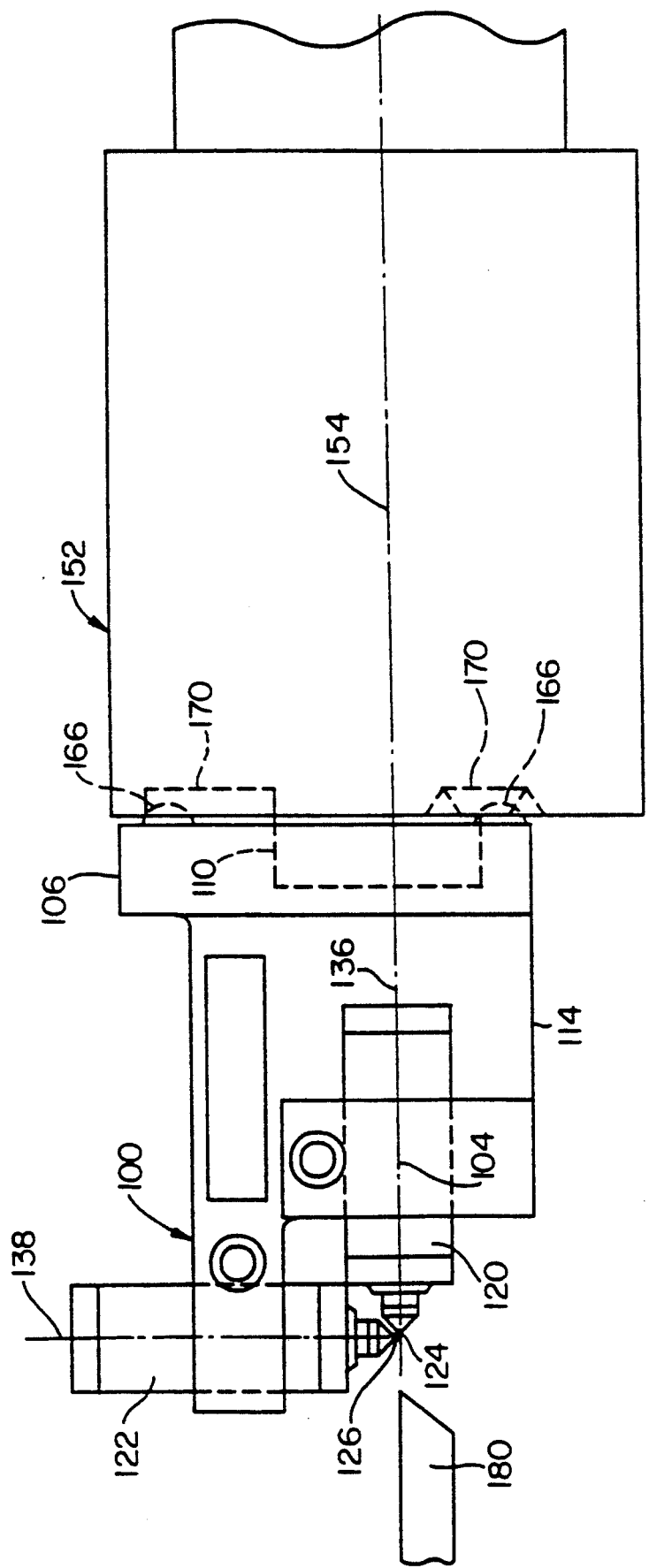
FIG. 5 is a side elevational view of the tool setter in accordance with the present invention secured to the workpiece holder of the lathe.

Probe supports 116, 118 are divided into an upper half 128 and a lower half 130 by means of a longitudinal slot 132. Cylindrical bores 134 which receive the machine tool detecting probes 120, 122 are arranged generally midway between the upper and lower halves 128, 130 intersecting slot 132 within probe supports 116, 118 and have a respective longitudinal axis 136, 138. Bore 134 within probe support 116 is arranged having its longitudinal axis 136 contained within a horizontal plane, as shown in FIG. 5, containing housing axis 104 of the tool setter 100. On the other hand, the longitudinal axis 138 of bore 134 within probe support e is arranged in a vertical plane, as shown in FIG. 5, which is transverse, i.e., perpendicular, to the plane containing longitudinal axes 104, 136. As shown in FIGS. 4 and 5, the horizontal plane containing longitudinal axes 104, 136 and the vertical plane containing longitudinal axis 138 also contains the styluses 124, 126 of the probes 120, 122. The probes 120, 122 are adjustably secured such that their styluses 124, 126 are maintained in the aforementioned relationship by compressing together the upper and lower halves 128, 130 of their respective probe supports 116, 118 about the probes by means of threaded bolts 140 or the like.

Referring to FIG. 3, the main body 114 of the tool setter 100 is provided with an enlarged cylindrical bore 140 having a threaded mouth which communicates with flange bore 110 by means of a smaller cylindrical connecting bore 142. A piston 144 is slidingly received within the enlarged bore 140 and has a shaft 146 extending through connecting bore 142 partially into flange bore 110. The outer diameter of piston 144 and shaft 146 are sufficiently smaller than the inside diameter of bores 110, 140 to allow the piston and shaft to be freely slidable therein, as well as having a certain degree of play to enable a limited degree of lateral or radial displacement of the piston and shaft for the purpose to be described hereinafter.

A compression coil spring 148 is positioned within the enlarged bore 140 in engagement with the rear surface of piston 144. The spring 148 is biased against the piston 144 by means of a screw 150 which is threadingly received within the threaded mouth of the enlarged bore 140. By adjusting the extent of travel of the screw 150 within enlarged bore 140, various degrees of compression of the spring 148 may be achieved for the purpose of maintaining shaft 146 extending into flange bore 110. The spring 148, however, enables inward movement of the piston 144 and shaft 146 within enlarged bore 140 in the event the shaft is improperly engaged during the mounting of the tool setter 100 to a workpiece holder as to be described hereinafter.

Figure 2:
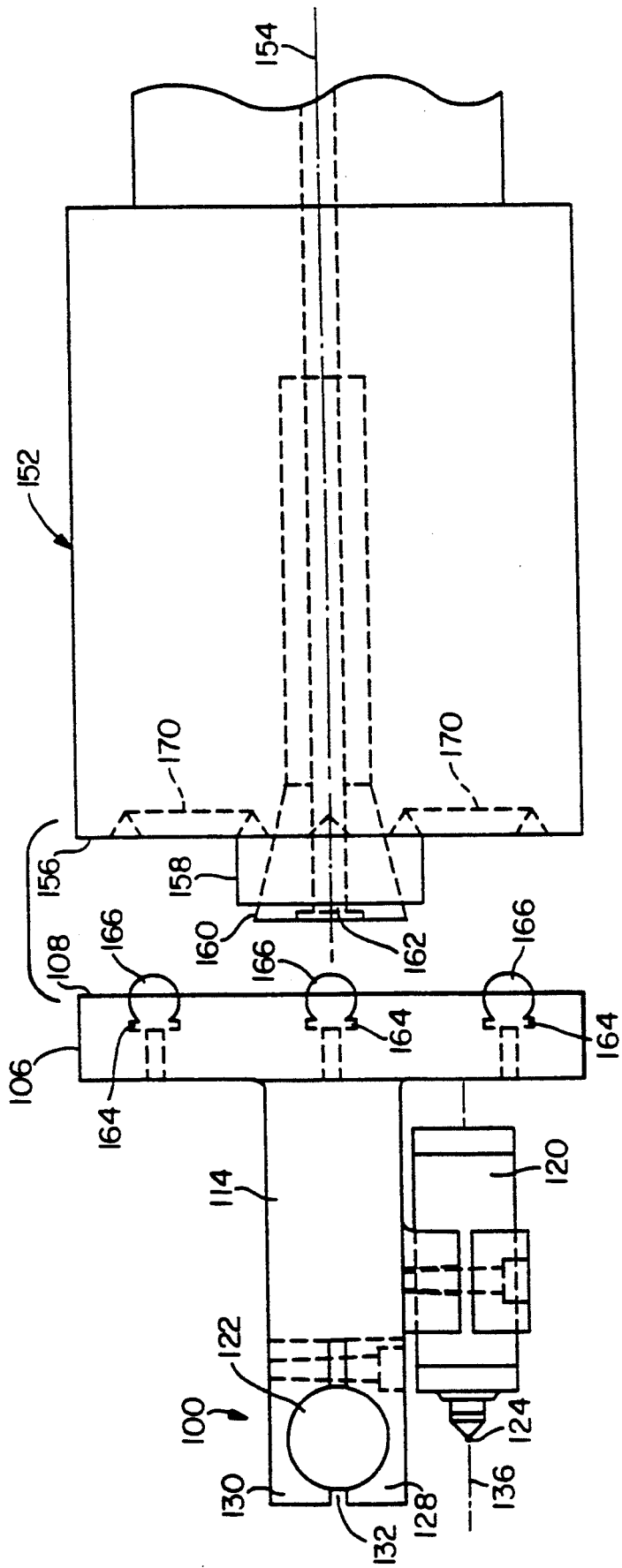
FIG. 2 is a top plan view showing the tool setter of the present invention disengaged from the workpiece holder of a lathe.

Referring now to FIGS. 2 and 3, there will be described the general securing of the tool setter 100 to a workpiece holder 152 of a lathe. As is conventional, the workpiece holder 152 is adapted for rotation about its rotational axis 154, i.e., center line. The workpiece holder 152 is provided with a planar face 156 which is transverse, i.e., perpendicular, to the rotational axis 154, and from which there extends outwardly a hollow spindle nose 158. An adjustable collet 160 having a collet bore 162 is received within the spindle nose 158 in alignment with the rotational axis 154 of the workpiece holder 152. Flange face 108 of the tool setter 100 is positioned opposing the workpiece holder face 156 and brought into close proximity until the spindle nose 158 is received within flange bore 110 and shaft 146 is received within the collet bore 162. Upon closing the collet 160, shaft 146 is securely engaged so as to hold the tool setter 100 in positioning the probes 120, 122 in approximate predetermined locations within the limits of the play provided between the shaft and piston 144 within their respective bores 140, 142 as previously described.

As thus far described, the tool setter 100 is initially secured to the workpiece holder 152 by the gripping action of the collet 160 on the shaft 146. At this time, the stylus 126 of probe 122 is positioned in close proximity to the rotational axis 154 of the workpiece holder 152 as shown in FIG. 4. As previously described, in order to precision machine a workpiece in a lathe, the operator must know the precise location of the machine tool at initiation of the machining operation. This necessitates that the styluses 124, 126 of the probes 120, 122 be repeatably and accurately positioned at precisely the same reference locations each time the tool setter 100 is mounted to the workpiece holder 152.

This is achieved by providing the flange face 108 and workpiece holder face 156 with a cooperating alignment assembly as to now be described with reference to FIGS. 1, 3 and 4. Flange face 108 is provided with three holes 164 into which there is secured by means of an adhesive or the like a spherical ball 166. The depth of the holes 164 are such that approximately one half of each ball 166 extends above the flange face 108. The balls 166 are spaced 120° apart about housing axis 104 of the tool setter 100 and at approximately equal radial positions therefrom, i.e., generally on a common circumference 168 having its center coinciding with the housing axis. The workpiece holder face 156 is provided with three radial V-grooves 170 which are spaced 120° apart about the rotational axis 154 of the workpiece holder 152 in order to receive balls 166 of the tool setter 100.

In attaching the tool setter 100 to the workpiece holder 152, the balls 166 are respectively aligned with and received in a corresponding V-groove 170 within the workpiece holder face 156. The capturing of the balls 166 within the V-grooves 170 will enable repeated positioning of the styluses 124, 126 of the machine tool detecting probes 120, 122 at predetermined fixed reference locations relative to the rotational axis 154 of the workpiece holder 152 upon each mounting of the tool setter 100 to the workpiece holder. In this regard, it is preferred that the stylus 126 of probe 122 be arranged along the rotational axis 154 of the workpiece holder 152. It is to be understood that the aforementioned alignment assembly may be used to provide registration of the styluses 124, 126 at other predetermined locations if so desired.

As thus far described, the closing of the collet 160 on the shaft 146 secures the tool setter 100, while receiving balls 166 within the V-grooves 170 precision aligns the styluses 124, 126 repeatedly at the predetermined reference locations. By providing play between the piston 144 and shaft 146 with respect to enlarged bore 140 and connecting bore 110, the balls 166 may be received within the V-grooves 170 so as to precision locate the styluses 124, 126 independent of securing the tool setter 100 to the workpiece holder 152 via action of the collet 160 in gripping the shaft. This arrangement simplifies the construction of the tool setter 100, while assuring the repeated precision alignment of the styluses 124, 126.

Figure 6:
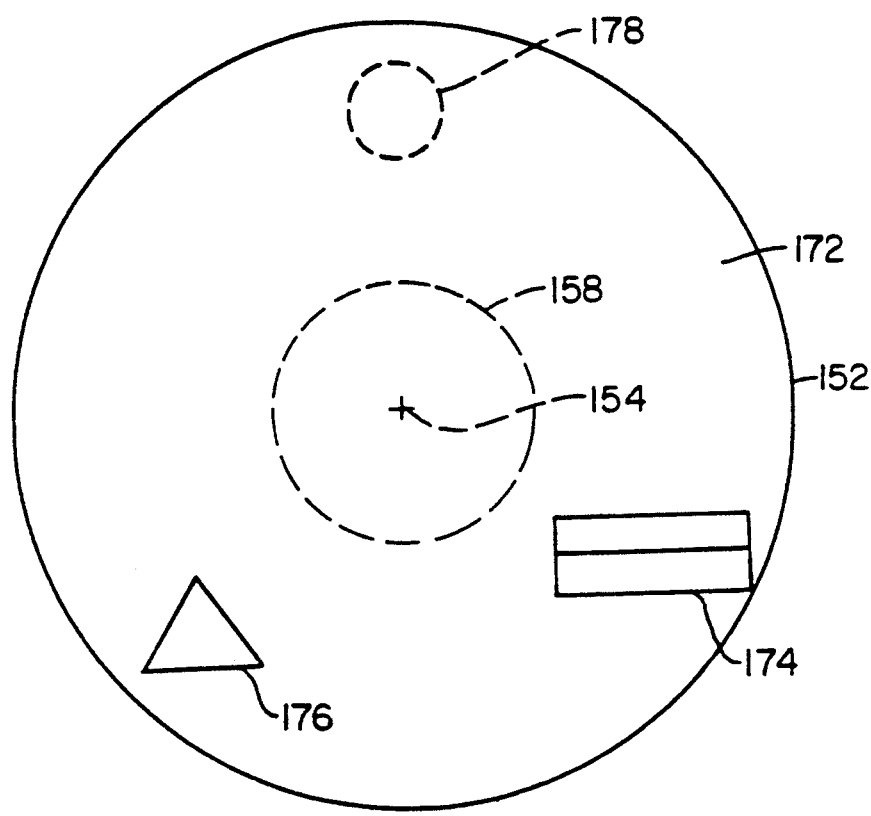
FIG. 6 is a front elevational view of the face of the workpiece holder of the lathe showing a point-line-plane arrangement for aligning the tool setter.

Referring now to FIG. 6, there is shown another embodiment of the construction of a workpiece holder 152 having a planar face 172 designed for cooperating with the balls 166 to align the styluses 124, 126 of the machine tool detecting probes 120, 122 as previously described. In this regard, the workpiece holder face 172 is provided with a single V-groove 174 and a conical or trihedral depression 176 which are spaced 120° apart about the rotational axis 154 of the workpiece holder 152. In use, the balls 166 of the tool setter 100 are respectively received one within V-groove 174, one within the conical or trihedral depression 176, and one engaging the workpiece holder face 172 at the location designated by the dashed lines 178. Although the precision alignment of the styluses 124, 126 of the probes 120, 122 has been described with reference to the aforementioned spherical balls/V-groove and spherical balls/point-line-plane arrangement, other such arrangements may be employed without departing from the spirit and scope of the present invention.

In use, the tool setter 100 is secured to the workpiece holder 152 and the styluses 124, 126 are aligned as previously described. The precise locations of the cutting edges of a machine tool 180 are located by engaging the machine tool with the styluses 124, 126 which triggers a response signal which is used to calibrate the machine tool location in a known manner, for example, as disclosed in U.S. Pat. Nos. 4,879,817 and 4,382,215. After calibrating the locations of the cutting edges of the machine tool, the tool setter 100 is removed from the workpiece holder 152 and a workpiece to be machined is secured thereto. The workpiece may now be automatically machined to precise predetermined dimensions under computer control.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A device securable to a workpiece holder for detecting the location of a machine tool, said device comprising a housing, securing means for releasably securing said housing to a workpiece holder, detecting means for detecting the location of a machine tool, and alignment means on said housing engaging a portion of said workpiece holder for aligning said detecting means at a predetermined location upon securing said housing to said workpiece holder.

2. The device of claim 1, wherein said workpiece holder has a rotational axis, said detecting means detecting the location of said machine tool relative to said rotational axis.

3. The device of claim 2, wherein said alignment means aligns said detecting means relative to said rotational axis of said workpiece holder.

4. The device of claim 3, wherein said detecting means is aligned along said rotational axis of said workpiece holder.

5. The device of claim 1, wherein said securing means comprises a shaft engaged by said workpiece holder.

6. The device of claim 5, wherein said shaft is received within a bore of said housing to permit movement of said shaft relative thereto.

7. The device of claim 6, wherein said shaft is biased within said bore to maintain said shaft in a position engagable by said workpiece holder while permitting restricted movement thereof inwardly of said housing away from said workpiece holder.

8. The device of claim 7, wherein said securing means further includes a piston secured to said shaft, a spring compressed against said piston for biasing said shaft, and adjusting means within said housing for adjusting the compression of said spring against said piston.

9. The device of claim 1, wherein said detecting means included a pair of said detecting means located along a pair of axes of said housing arranged perpendicular to one another.

10. The device of claim 1, wherein said alignment means comprise a plurality of balls radial spaced about said housing for engaging a portion of said workpiece holder.

11. The device of claim 10, further including a workpiece holder, said workpiece holder including cooperating means for receiving said balls to align said detecting means at said predetermined location upon securing said housing to said workpiece holder.

12. The device of claim 11, wherein said cooperating means comprise a plurality of grooves radial spaced about said workpiece holder.

13. The device of claim 11, wherein said cooperating means comprises a groove, a conical or trihedral opening and a portion of said workpiece holder radial spaced about said workpiece holder.

14. The device of claim 1, wherein said alignment means is arranged at a fixed predetermined location on said housing.

15. A device for detecting the location of a machine tool relative to a workpiece holder having a rotational axis, said device comprising a housing, securing means for releasably securing said housing to a workpiece holder, detecting means for detecting the location of a machine tool relative to the rotational axis of said workpiece holder, and aligning means on said housing engaging a portion of said workpiece holder for aligning said detecting means independent of said securing means at a predetermined location relative to said rotational axis of said workpiece holder upon securing said housing to said workpiece holder.

16. The device of claim 15, wherein said securing means comprises a shaft engaged by said workpiece holder.

17. The device of claim 16, wherein said shaft is received within a bore of said housing to permit movement of said shaft relative thereto.

18. The device of claim 17, wherein said shaft is biased within said bore to maintain said shaft in a position engagable by said workpiece holder while permitting restricted movement thereof inwardly of said housing away from said workpiece holder.

19. The device of claim 18, wherein said securing means further includes a piston secured to said shaft, a spring compressed against said piston for biasing said shaft, and adjusting means within said housing for adjusting the compression of said spring against said piston.

20. The device of claim 15, wherein said detecting means included a pair of said detecting means located along a pair of axes of said housing arranged perpendicular to one another.

21. The device of claim 15, wherein said alignment means comprise a plurality of balls radial spaced about said housing for engaging a portion of said workpiece holder.

22. The device of claim 21, further including a workpiece holder, said workpiece holder including cooperating means for receiving said balls to align said detecting means at said predetermined location upon securing said housing to said workpiece holder.

23. The device of claim 15, wherein said aligning means is arranged at a fixed predetermined location on said housing.

24. An assembly for detecting the location of a machine tool, said assembly comprising a workpiece holder, a tool setter releasably securable to said workpiece holder, said tool setter including detecting means for detecting the location of a machine tool, first alignment means on said tool setter and second alignment means on said workpiece holder cooperating with said first alignment means for aligning said detecting means at a predetermined location upon securing said tool setter to said workpiece holder.

25. The device of claim 24, wherein said first and second alignment means aligns said detecting means relative to a rotational axis of said workpiece holder.

26. The device of claim 24, further including securing means for releasably securing said tool setter to said workpiece holder.

27. The device of claim 26, wherein said securing means comprises a shaft engaged by said workpiece holder, said shaft received within a bore of said tool setter to permit movement of said shaft relative thereto.

28. The device of claim 27, wherein said shaft is biased within said bore to maintain said shaft in a position engagable by said workpiece holder while permitting restricted movement thereof inwardly of said tool setter away from said workpiece holder.

29. The device of claim 28, wherein said securing means further includes a piston secured to said shaft, a spring compressed against said piston for biasing said shaft, and adjusting means within said tool setter for adjusting the compression of said spring against said piston.

30. The device of claim 24, wherein said first alignment means comprise a plurality of balls radial spaced about said tool setter for engaging a portion of said workpiece holder.

31. The device of claim 30, wherein said second alignment means comprise a plurality of grooves radial spaced about said workpiece holder.

32. The device of claim 30, wherein said second alignment means comprise a groove, a conical or trihedral opening and a portion of said workpiece holder radial spaced about said workpiece holder.

33. A device for detecting the location of a machine tool relative to a workpiece holder having a rotational axis, said device comprising a housing; securing means for releasably securing said housing to a workpiece holder, said securing means comprising a shaft engaged by said workpiece holder received within a bore of said housing to permit movement of said shaft relative thereto, a piston secured to said shaft, a spring compressed against said piston to maintain said shaft in a position engagable by said workpiece holder while permitting restricted movement thereof inwardly of said housing away from said workpiece holder, and adjusting means within said housing for adjusting the compression of said spring against said piston; at least one detecting means for detecting the location of a machine tool relative to the rotational axis of said workpiece holder; and aligning means for aligning said detecting means independent of said securing means at a predetermined location relative to said rotational axis of said workpiece holder upon securing said housing to said workpiece holder, said alignment means comprising a plurality of balls radial spaced about said housing for engaging a portion of said workpiece holder.

34. The device of claim 33, further including a workpiece holder, said workpiece holder including cooperating means for receiving said balls to align said detecting means at said predetermined location upon securing said housing to said workpiece holder.

35. A device securable to a workpiece holder for detecting the location of a machine tool, said device comprising a housing, securing means for releasable securing said housing to a workpiece holder, detecting means for detecting the location of a machine tool, and alignment means for aligning said detecting means at a predetermined location upon securing said housing to said workpiece holder, said alignment means comprising a plurality of balls radial spaced about said housing for engaging a portion of said workpiece holder.

36. A device securable to a workpiece holder for detecting the location of a machine tool, said device comprising a housing having a bore; securing means comprising a shaft received within said bore to permit movement of said shaft relative thereto, said shaft releasably securing said housing to a workpiece holder upon arrangement therewith, said shaft biased within said bore to maintain said shaft in a position engagable by said workpiece holder while permitting restricted movement thereof inwardly of said housing away from said workpiece holder, a piston secured to said shaft, a spring compressed against said piston for biasing said shaft, and adjusting means within said housing for adjusting the compression of said spring against said piston; detecting means for detecting the location of a machine tool; and alignment means for aligning said detecting means at a predetermined location upon securing said housing to said workpiece holder.

37. A device for detecting the location of a machine tool relative to a workpiece holder having a rotational axis, said device comprising a housing, securing means for releasably securing said housing to a workpiece holder, detecting means for detecting the location of a machine tool relative to the rotational axis of said workpiece holder, and aligning means for aligning said detecting means independent of said securing means at a predetermined location relative to said rotational axis of said workpiece holder upon securing said housing to said workpiece holder, said aligning means comprising a plurality of balls radial spaced about said housing for engaging a portion of said workpiece holder.

38. A device for detecting the location of a machine tool relative to a workpiece holder having a rotational axis, said device comprising a housing having a bore; securing means comprising a shaft received within said bore to permit movement of said shaft relative thereto, said shaft releasably securing said housing to a workpiece holder upon engagement therewith, said shaft biased within said bore to maintain said shaft in a position engagable by said workpiece holder while permitting restricted movement thereof inwardly of said housing away from said workpiece holder, a piston secured to said shaft, a spring compressed against said piston for biasing said shaft, and adjusting means within said housing for adjusting the compression of said spring against said piston; detecting means for detecting the location of a machine tool relative to the rotational axis of said workpiece holder; and aligning means for aligning said detecting means independent of said securing means at a predetermined location relative to said rotational axis of said workpiece holder upon securing said housing to said workpiece holder.

39. A device securable to a workpiece holder for detecting the location of machine tool, said device comprising a housing, securing means for releasably securing said housing to a workpiece holder, detecting means for detecting the location of a machine tool located along a rotational axis of said workpiece holder, and alignment means for aligning said detecting means along said rotational axis of said workpiece holder simultaneously upon securing said housing to said workpiece holder.

40. The device of claim 39, wherein said detecting means includes a pair of said detecting means located along a pair of intersecting axes arranged perpendicular to one another.

41. The device of claim 40, wherein one of said axes coincides with the rotational axis of said workpiece holder.

* * * * *

UNITED STATES PATENT AND TRADEMARK OFFICE
CERTIFICATE OF CORRECTION

PATENT NO. : 5,272,818
DATED : December 28, 1993
INVENTOR(S) : Youden, et al.

It is certified that error appears in the above-indentified patent and that said Letters Patent is hereby corrected as shown below:

Column 2, line 7, "decrees" should read --degrees--.
Column 3, line 28, "radial" should read --radially--.
Column 4, line 26, "e" should read --118--.
Column 7, line 29, "radial" should read --radially--.
Column 7, line 38, "radial" should read --radially--.
Column 7, line 42, "radial" should read --radially--.
Column 8, line 14, "radial" should read --radially--.
Column 8, line 57, "radial" should read --radially--.
Column 8, line 61, "radial" should read --radially--.
Column 8, line 65, "radial" should read --radially--.
Column 9, line 20, "radial" should read --radially--.
Column 9, line 29, "releasable" should read --releasably--.
Column 9, line 35, "radial" should read --radially--.
Column 10, line 14, "radial" should read --radially--.

UNITED STATES PATENT AND TRADEMARK OFFICE
CERTIFICATE OF CORRECTION

PATENT NO. : 5,272,818
DATED : December 28, 1993
INVENTOR(S) : Youden, et al.

It is certified that error appears in the above-indentified patent and that said Letters Patent is hereby corrected as shown below:

Column 10, line 38, after "of" insert --a--.

Signed and Sealed this

Twenty-first Day of June, 1994

Attest:

BRUCE LEHMAN

Attesting Officer  Commissioner of Patents and Trademarks